United States Patent

[11] 3,534,835

| [72] | Inventor | Ernst Meier<br>Frankfurt (Main)-Sindlingen, Germany |
|---|---|---|
| [21] | Appl. No. | 725,988 |
| [22] | Filed | May 2, 1968 |
| [45] | Patented | Oct. 20, 1970 |
| [73] | Assignee | Alfred Teves G.m.b.H.<br>Frankfurt, am Main, Germany<br>a corporation of Germany |
| [32] | Priority | May 5, 1967 |
| [33] | | Germany |
| [31] | | 733,799 |

[54] DISK BRAKE
12 Claims, 8 Drawing Figs.

[52] U.S. Cl. ............................................ 188/196,
188/73
[51] Int. Cl. .................................................. F16d 65/56,
F16d 55/14
[50] Field of Search .................................. 188/72—73(C),
79.5(M), 196(F), (FR), (PRR)

[56] References Cited
UNITED STATES PATENTS

| 3,331,472 | 7/1967 | Swift | 188/73(C)UX |
| 3,410,373 | 11/1968 | Pace | 188/196(F)UX |

FOREIGN PATENTS

| 631,880 | 11/1949 | Great Britain | 188/72(C)UX |

Primary Examiner—Duane A. Reger
Attorney—Karl F. Ross

ABSTRACT: A disk brake with self-adjusting mechanism for reestablishing original brake play by compensating the rest position of a brakeshoe for brake lining wear. The mechanism includes an adjusting spindle inserted between the brakeshoe and the brake housing. The wear-compensating mechanism acts upon one of two brakeshoes which is drawn against the braking face of the disk to which it is confrontingly juxtaposed, by reaction force resulting when a hydraulically actuated wheel brake cylinder-and-piston mechanism urges the brakeshoe on the opposite side of the disk against the proximate braking face of the latter. A sensor cooperating with the brake lining limits the adjustment to the exact amount of wear to maintain a constant brake play.

FIG.1
FIG.2
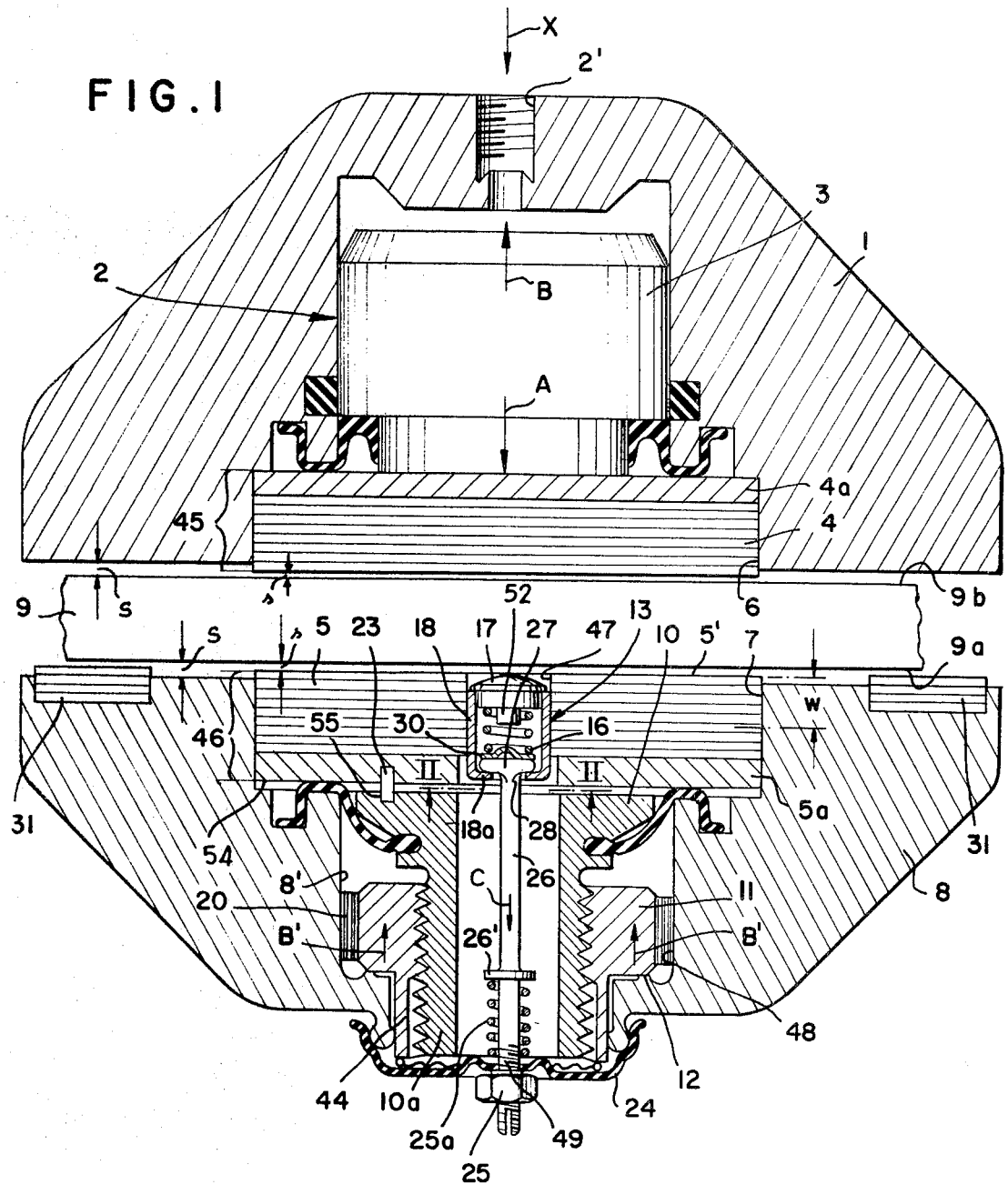
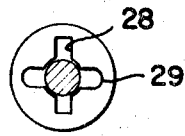
ERNST MEIER
*INVENTOR.*
BY *Karl F. Ross*
ATTORNEY

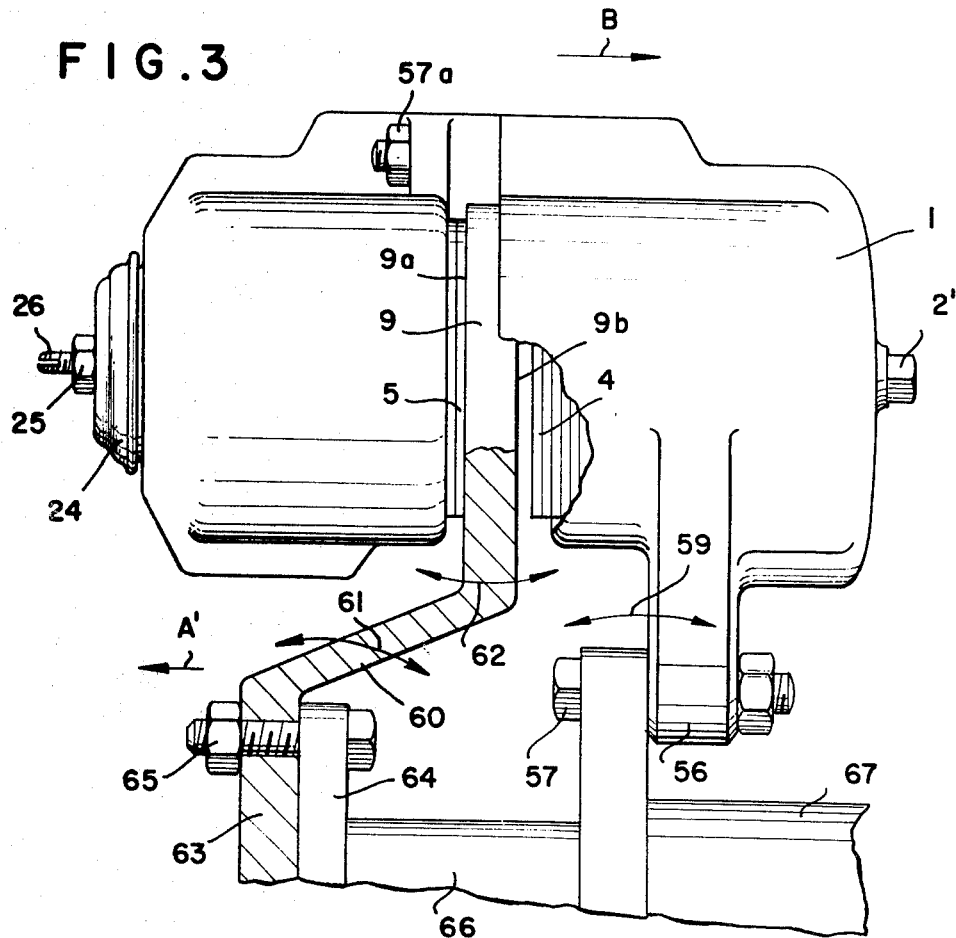
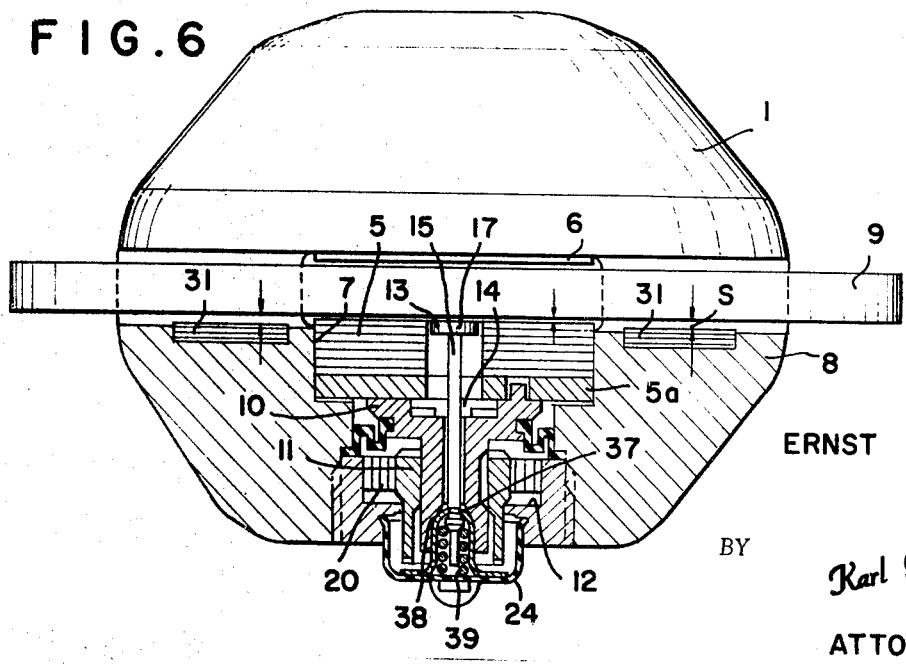

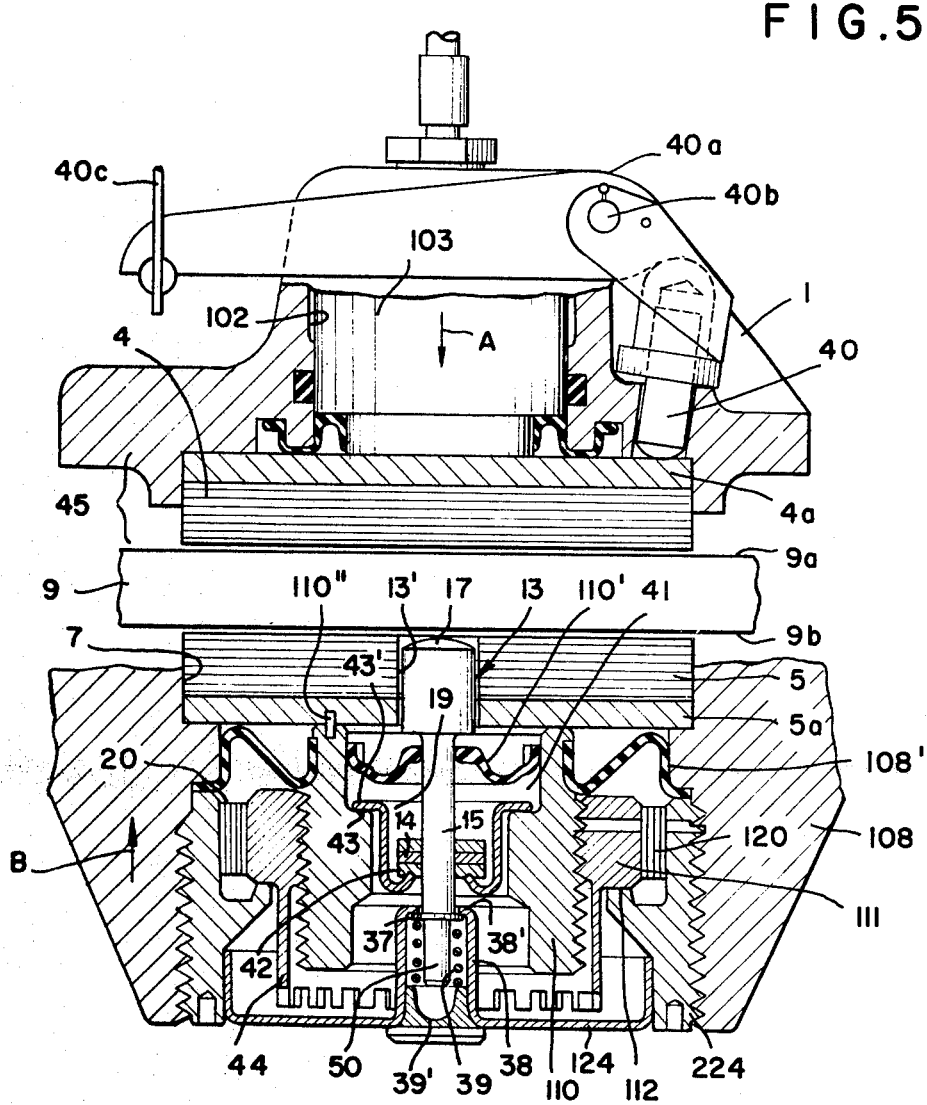
FIG.5
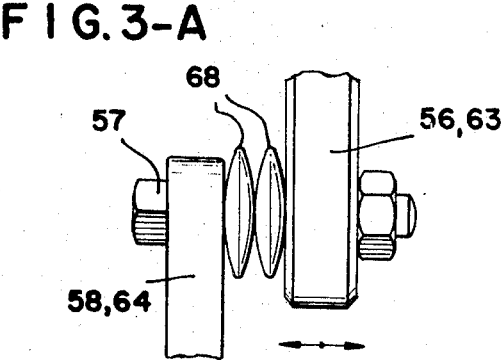
FIG.3-A
ERNST MEIER
 INVENTOR.
BY
Karl F. Ross
ATTORNEY

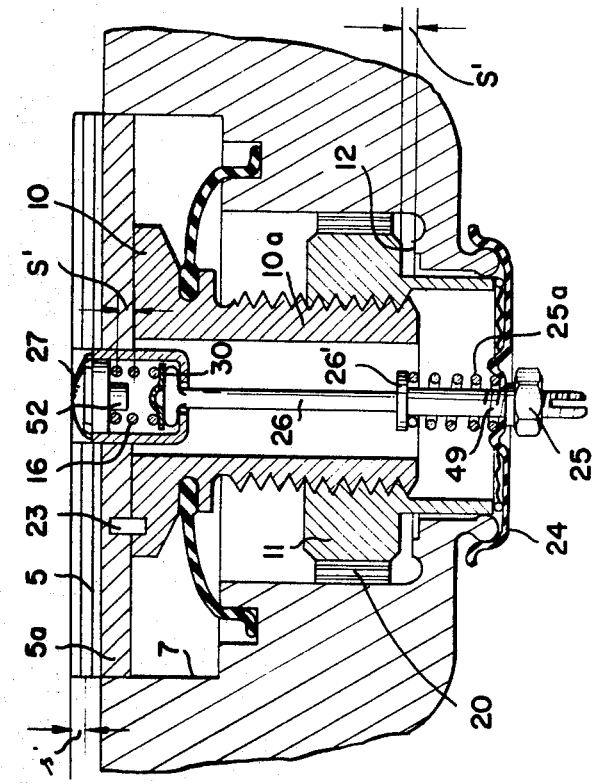
FIG. 4-A
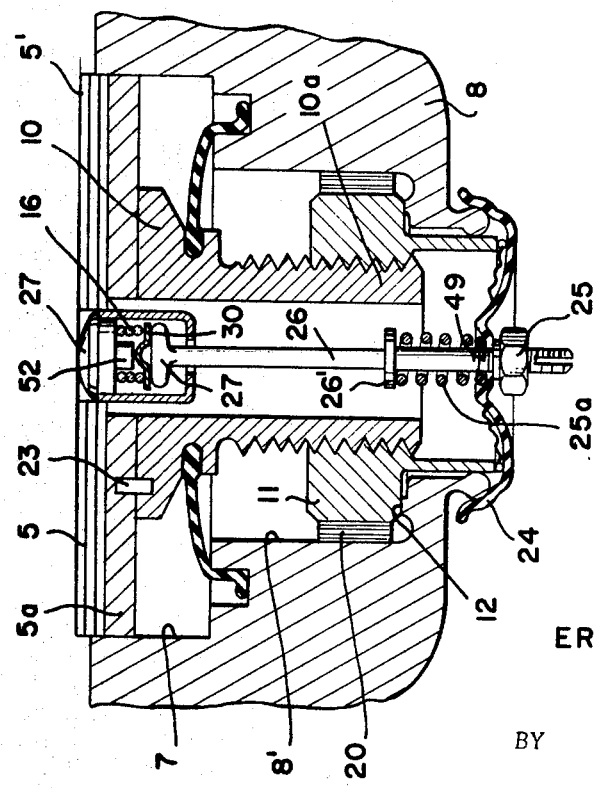
FIG. 4
ERNST MEIER
*INVENTOR.*
BY
*Karl F. Ross*
ATTORNEY

DISK BRAKE

The present invention relates to a disk brake for automotive vehicles and, more particularly, to a disk brake with an automatic self-adjusting wear-compensating mechanism for brakeshoes which are urged against the brake disk by a single actuation (*i.e.* a single wheelbrake cylinder).

A number of wear-compensating means intended to overcome an undesirable increase in brake "play" (*i.e.* the normal stroke of the actuator, brakeshoes, etc., until the brake lining bears fully against the disk) have been described in prior art. None of them is entirely satisfactory because they tend to undercompensate or overcompensate for the wear of the brake lining which causes the increase in play. For practical purposes the stroke of the brakeshoes is held small, and variations therefrom are in the tenth-of-a-millimeter range. The required adjustments are thus difficult to gauge and to actuate with the available conventional wear-compensating mechanisms. Another difficulty is introduced when the brake play is increased due to a sudden temporary strain imposed by an excessive braking force. The subsequent advance of the brakeshoes is not commensurate with the actual wear and leads to serious complications when the release of the brake relieves the strain.

When reference is made hereinafter to a disk brake, it should be understood that two general types of brakes are contemplated. In one of these arrangements, a brake caliper or yoke extending around the periphery of the brake disk (which is secured to a wheel of the vehicle) is provided with one leg or lobe forming a wheelbrake cylinder whose piston urges a proximal brakeshoe against the disk. The other leg or lobe of the yoke or caliper retains a further brakeshoe which is not displaceable by an independent wheelbrake cylinder but is brought into contact with the other face of the disk as a result of the displacement of the proximal brakeshoe by the single wheelbrake piston. This may be accomplished by either of three functionally similar but distinct techniques. In the first of these techniques, the caliper is movable relatively to its housing and the vehicle chassis and thus transversely to the surfaces of the brake disk so that displacement of the proximal brakeshoe by its wheelbrake piston against the disk will draw the remote brakeshoe and the caliper in the opposite direction against the other surface of the disk as a result of the reaction forces generated by hydraulic pressurization of the single wheelbrake cylinder. In this case, the caliper acts as a force-transmitting member between the single wheelbrake cylinder and the remote or distal brakeshoe. Arrangements of this type are commonly known as floating yoke, swinging yoke and movable yoke brakes. In the second technique, the disk itself is axially shiftable, *e.g.* along splines formed on the axle shaft, while the yoke remains fixed. In this system, axial pressure is applied by the wheelbrake piston to one brakeshoe which, in turn, engages the disk and drives it into frictional engagement with the other brakeshoe. A third arrangement, generally analogous to the first, provides a fixed yoke or caliper and a force-transmitting member in the form of a frame which reaches over the disk and applies reaction force to the distal brakeshoe which is movably mounted in a fixed lobe of the yoke.

In addition to the aforedescribed systems, disk brakes may be of the fixed-yoke type in which both lobes or legs of the yoke are provided with respective wheel cylinders whose pistons each engage a corresponding brakeshoe to clamp the disk between them. In systems of this type, considerable more space must be provided within, for example, the dished tire-carrying wheel disk to accommodate a wheelbrake cylinder at a location remote from the axle housing flange to which the other lobe of the yoke is attached. Consequently, it is advantageous on the one hand to avoid the use of a wheelbrake cylinder in the wheel side of a disk brake. However, conventional floating yoke mounting systems have also proved to be problematic when the yoke is employed as the force-transmitting member. The latter problems predominantly derive from the type of mounting, and damage to mounting required for gross movement of the force-transmitting yoke, and axially shiftable disk or a force-transmitting frame.

It is therefore the primary object of my invention to overcome the disadvantages of known wear-compensating means for automotive disk brakes by providing a mechanism which reliably adjusts the wear of the brakeshoes and automatically repositions the brake lining to maintain a constant play.

A further object is to provide a wear-compensating mechanism whose components are durable and easy to install, to service and to replace when necessary and which is not affected by dimensional variations in the brake housing.

These objects and others which will become apparent hereinafter are attained, in accordance with the present invention, in a disk brake which preferably is resiliently mounted on the vehicle chassis for slight movement thereon, and which has a single actuator to urge both brakeshoes against the brake disk. The actuator, formed by a wheelbrake cylinder in one lobe of the brake yoke, drives one brakeshoe against the disk and simultaneously transmits a reaction force to the other yoke lobe, drawing it in the opposite direction to bring the other brakeshoe against the opposite face of the disk. The wear-compensating mechanism is provided for that brakeshoe which is drawn against the disk by the reaction force, and which is connected via that mechanism to the brake housing.

It is to be understood that the above description is not exclusive, and that it may be extended to cover different types of disk brakes. For example, my invention can also be applied in disk brakes mounted floatingly or glidingly, or in disk brakes having different means for the transmission of the reaction force.

In the preferred embodiment of my invention the resiliently mounted disk brake is designed to overcome, or at least to reduce, drawbacks of a stationary yoke as well as of floating yoke construction, and to combine their respective advantages. It dispenses with the large space required by the conventional stationary yoke which is difficult to fit into the available room between the disk and the wheel rim. It does not overheat, as does the typical stationary yoke disk brake, especially on the rear wheel axle of the vehicle where vapor bubbles are apt to develop in the insufficiently ventilated inner cylinder which is shielded against the cooling air stream. And it does not require, as does the floating yoke disk brake, sliding guides or floating pins in wedge-shaped grooves which are difficult to protect against damage caused by gravel, salt water and mud.

More specifically, I have found that it is possible to obtain advantages of the fixed yoke disk brake and yet avoid the need for a cantilevered wheel brake cylinder in the lobe of the yoke remote from the axle housing flange to which the yoke is secured by providing a disk brake arrangement in which a pair of brakeshoes are supported on opposite sides of the brake disk and only a single wheel brake cylinder is provided, preferably on the side of the disk at which the axle housing flange is disposed. A force-transmitting member, preferably a yoke or a caliper, reaches around the periphery of the disk and supports the wheel brake cylinder as well as the distal brakeshoe while the disk member is disposed between these brakeshoes; one of the members is resiliently deflectable by elastic deformation in a direction perpendicular to the braking faces of the disk members so that gross movement of either the disk member or the force-transmitting or yoke member is not necessary. According to an essential feature of this invention, the lobe of the force-transmitting member remote from the wheelbrake cylinder is provided with automatically operable self-adjusting means interposed between this lobe and the backing plate of its brakeshoe to advance the latter in step with the wear of the brake lining, thereby maintaining a constant brake play. Since there is no gross movement of the distal brakeshoe with respect to the lobe of the force-transmitting member on which it is mounted during normal brake operation, I have found it advisable to provide a sensing element which measures the wear of the distal brakeshoe and preferably continuously bears upon the disk in the actuated condition of the brake, to release a prestressed spindle arrangement whose threaded parts are movably displaced with wear of the brakeshoe, spacing the backing plate thereof further from its steering position in step with the brakeshoe wear. The invention is thus applicable to brake yokes which are completely fixed (e.g. where the disk is axially deflectable or shiftable on splines or the like) and to arrangements in which the yoke support is resiliently deflectable or the yoke itself is deformable or resiliently mounted so as to be urged by the reaction force in the direction of the distal side of the disk.

The cushioned mounting of a stationary yoke of my invention is especially adapted to take up the minor elastic deformation of the housing against the disk, and of the disk in the direction away from the housing, which is caused by the pressure of the single wheelbrake piston against the proximate brakeshoe, and which must be greater than the play between the disk and the brakeshoes. The normal elasticity of a cast iron brake disk is usually adequate to sustain such minor deformations. When greater resilience is required, a supplemental spring element may be interposed between the yoke and the wheel axle mounting.

The wear-compensating mechanism associated with the brakeshoe which is actuatable by the reaction force, advantageously is provided with a threaded spindle, axially movable toward the brakeshoe so as to decrease the play between the latter and the brake disk. A feeler, forming a sensing element and integrated with a friction element, received in a recess formed in the center of the brakeshoe, continuously senses the increase in play due to the abrasion of the brake lining. Whereas the spindle is exposed to a torque which transmits pressure upon the brakeshoe to decrease the brake play, the friction element cooperating with the feeler exerts a force in the opposite direction to limit the advance of the brakeshoe beyond the interval reserved for the predetermined brake play.

In the preferred embodiment of my invention the friction element comprises a sleeve axially slidable in a recess in the center of the brakeshoe under the influence of relatively strong forces. A feeler head made of hardened material closes off the sleeve against the brake disk. The frictional force between the sleeve and the walls of the recess, and a stop provided in the interior of the brake housing at the opposite extension of the latter, delimit the length through which the brakeshoe may be advanced after wear of the brake lining to maintain a constant brake play. A plate in the base of the sleeve admits a shaft terminating inside the sleeve in a hammerhead to form a bayonet catch which is secured against accidental unlocking by a spring inserted between the hammerhead and the head of the feeler. The axially movable shaft is attached to the brake housing in a manner which permits its length to be varied. In another variant of my invention the free end of the shaft is attached to an elastically deformable member such as a spring plate which abuts against a lug fixed in the brake housing. Additional spring means may be interposed between the spring plate and the housing.

The advance of the spindle is initiated by the torsional force imparted by a spiral spring to an adjusting nut threadedly engaging the exterior of the spindle.

Auxiliary brake linings provided laterally on each side of the conventional brake linings, are adapted to give emergency brake effectiveness to keep the vehicle operable to the nearest repair shop, if a malfunction blocks the main braking action.

The above and other objects, features and advantages of this invention will become more readily apparent from the following description, reference being made to the accompanying drawing in which:

FIG. 1 is an axial cross-sectional view of a disk-type wheelbrake for an automotive vehicle in accordance with the present invention;

FIG. 2 is a cross-sectional view taken along the line II–II of FIG. 1;

FIG. 3 is a side-elevational view, partly broken away, of a disk brake assembly according to my invention;

FIG. 3A is a view of a detail of an alternative form of the invention;

FIGS. 4 and 4A are fragmentary cross-sectional views of a disk brake according to my invention, with the wear-compensating adjustment in successive stages of advance;

FIG. 5 is an axial cross-sectional view corresponding to another embodiment of my invention; and FIG. 6 is an axial cross-sectional view corresponding to yet another embodiment of my invention.

In FIG. 1, I show a disk brake yoke of an automotive vehicle formed by the lobe 1 and the lobe 8, resiliently or rigidly mounted on the axle housing adjacent the wheel (not shown) to which the brake disk 9 is secured. The annular braking faces 9a and 9b of the disk extend perpendicularly to the axis of the single wheel brake cylinder 2 in the yoke half 1. The wheelbrake cylinder 2 slidably receives a piston 3 which urges the brakeshoe 45, comprising the brake lining 4 and the backing plate 4a and slidable in the recess 6 of the yoke 1, against the disk face 9b of the disk 9. To this end, brake fluid is supplied to the wheelbrake cylinder 2 via an inlet 2' and a transmission network and a master cylinder in the conventional manner.

Under the pressure of the hydraulic fluid the piston 3 is shifted toward the disk 9 to take up first the brake play $s$ and then to force the brakeshoe 45 against the juxtaposed surface 9b of the brake disk. Simultaneously pressure is applied in the opposite axial direction through a reaction force bearing upon yoke half 8, thereby drawing the brakeshoe 46 against the face 9a of the disk 9. The brakeshoe 46 formed by the brake lining 5 and the attached backing plate 5a is slidable in the recess 7 in the yoke half 8, and includes a central aperture 47 frictionally housing a sensing sleeve 18. The sleeve is axially slidable in the aperture 47 only under hydraulic brake pressure in the direction perpendicular to the disk, and is closed off at its end proximal to the disk 9, by a hardened feeler head 17, and at its opposite end by the base flange 18a which surrounds a slotted opening 28 (see FIG. 2). Auxiliary shoes 31 are rendered operative upon complete wear of the brake lining 5 or failure of the adjusting mechanism.

A spindle 10 abutting against the backing plate 5a of the brakeshoe 46, threadedly receives the adjusting nut 11 which normally rests against the surface 12 in the yoke half 8 and is frictionally restrained thereby against rotation. An extension 44 of the nut 11 extends to the inner surface of the cover 24 closing chamber 8' of the yoke half 8, and permits manual resetting of the nut 11 by pressing it inwardly and then rotating it to tighten the spring 20.

The spiral spring 20, retained in the annular clearance 48 between the nut 11 and the wall of chamber 8', is adapted to impart a torque to the nut 11 when the latter is lifted from the seat 12, and thereby rotate the nut 11 to advance the non-rotatable shank 10a of threaded spindle 10 and bring it to bear against the brakeshoe 46. Due to the prestress of the spring 20 the advance of the spindle 10 (arrows B') continues until it is checked by the frictional counterforce of surface 12.

A slotted opening 28 in the sleeve base 18a admits a hammerhead 27 attached to the rod 26 which, at its opposite end, is retained against the cover 24 of the yoke half 8 by means of its threaded portion 49 and an adjusting nut 25, as well as the spring 25a ; the latter bears upon the flange 26' of the rod 26 and the cap 24 in opposite directions. The nut 25 permits a lengthwise adjustment of the rod 26 to establish the predetermined brake play. The hammerhead 27 may be rotated through a 90° angle (FIG. 2), to fit into a slot 29 in the sleeve base 18a and thereby form a bayonet coupling therewith.

Springs 16 inside the sleeve 18, positioned between the feeler head 17 and a resilient disk 30 resting against the hammerhead 27, are designed to yield within the lost motion of the sleeve 18. The sleeve 18, the feeler head 17 and the rod 26 jointly form the feeler or sensor which may be replaced together with the brakeshoe upon complete wear thereof. A pin 23 inserted in the backing plate 5a and connecting the latter to the spindle 10 prevents the spindle from rotating along with the adjusting nut 11.

The disk brake assembly shown in FIG. 3 has a flange 56 of the yoke half 1 (*i.e.* the flange half) which is fixed resiliently by means of bolts 57 or similar means, to the axle housing via the flange 58 inwardly of the wheel disk (not shown) of the vehicle wheel which encloses the wheel half 8 of the yoke. The outer portion of the yoke, that is the yoke half 8, is cantilevered on the yoke half 1 and connected to the latter by bolts 57a extending perpendicularly to the disk.

As indicated earlier, the invention is primarily intended to apply to so-called "fixed yoke" brakes in which, as in FIG. 3, the supported portion is fixed rigidly to the flange 58 of the axle housing. It has been found that this flange is often sufficiently resiliently deflectable (as represented by the arrow 59) to allow the yoke to act as the force-transmitting member. In addition (or in the alternative), the disk 9 may have a web 60 connected to its hub which is resiliently deflectable as represented by arrow 61 or arrow 62. The hub 63 of the disk is here shown to be attached to the flange of the wheel axle 64 by bolts 65 at a region of the axle 66 extending through the axle housing 67.

However, the present invention is equally appropriate when the brake support member 56, 58 or the disk member 9, 60 is provided with auxiliary means affording some slight axial movement (of the order of tenths of a millimeter) in the direction B for the yoke and/or in the direction A for the disk. This may be achieved, for example, by providing relatively stiff belleville washers (dished disk springs) 68 around the bolts 57, 65 between the respective flange or hub 56, 63 and the axle flange or housing flange as shown diagrammatically in FIG. 3A at 58, 64. It will be equally apparent that other means for achieving this result, *i.e.* the limited deflection of the force-transmitting member can also be employed. Note also that, instead of the force-transmitting member in the form of a yoke, the yoke can be fully rigid and force transmission effected by a frame of the type described in the commonly assigned copending application Ser. No. 681,330 filed Nov. 8, 1967, now U.S. Pat. No. 3,490,565.

The adjusting means, according to the embodiment shown in FIG. 1 operates as follows: upon initiation of the braking action the brakeshoe 46, together with the sleeve 18 which is frictionally set in the recess 47 of the brakeshoe, is drawn against the face 9a of the disk 9. The displacement of the brakeshoe 46 depends on the brake play s and on the wear w of the lining 5, that is, on the distance the brakeshoe must traverse to contact the brake disk 9. It has an upper limit set by the distance through which the disk 30 (of the sensor 13) can move against the tension of the springs 16 before it abuts against a boss 52 on the base of the feeler head 17.

Thus, referring to the structure shown in FIGS. 1 and 4, it is apparent that the displacement by the piston 3 of the brakeshoe 45 in the direction of arrow A against the braking face 9b of the disk 9 results in a reaction force B which draws the yoke 1, 8 in this direction. In the position of the adjusting mechanism illustrated in FIG. 1, the nonrotatable spindle 10, whose threaded shank 10a is engaged by the nut 11, bears upon the backing plate 5a of the brakeshoe 46. The nut 11, however, rests against the narrow annular seat 12 of the housing lobe 8 and is frictionally retained thereby against rotation. Movement of the housing 1, 8 in the direction of arrow B, therefore, applies a corresponding force at B′ against the nut 11 and entrains the latter in the direction of arrow B to bring the brakeshoe 46 into contact with the surface 9a of the disk 9. Contact between surface 5′ of the brake lining and the surface 9a of the disk is accompanied by an engagement of the hardened head 17 of the sensor 13 which is frictionally received in an opening 47 of the brakeshoe. As the lining 5 wears, the head 17 and the feeler 13 are set back further into the brakeshoe 46 to lift the stem or rod 46 in the direction of C. This movement is resisted by the spring 25a. When hydraulic pressure in cylinder 2 is released, therefore, the rod 26 is urged again in the direction of arrow B by the springs 25a while the sensor 13 frictionally entrains the brakeshoe 46 in this direction as well. The spindle 10 can move freely in the direction of arrow B thereby lifting the nut 11 from the annular seat 12 and frictionally release this nut. The nut consequently rotates under the control of spring 20 to advance the brakeshoe 46 until the nut 25 engages the cap 24 (FIG. 4) and the flange 18a engages the gross head 27 of the rod. The brakeshoe is then in its automatically adjusted position for a repetition of this procedure.

In the embodiment of FIG. 5, wherein similar elements have been indicated with the reference numerals previously used, the function of the sleeve 18 is taken over by the stack of friction disks 14 mounted on the shaft 15 and on which it is slidable when the axial force, derived from hydraulic brake actuation and movement of the yoke in the direction of arrow B, acts on the friction disks 14. The shaft 15 terminates at a feeler head 17 of the sensor 13 juxtaposed with the face 9a of the disk 9 and, at its opposite end, at an annular flange 37 which cooperates with the boss 38 fitted into the housing 8.

The rod 15 has an extension 50 beyond the disk 37 and received within the cylindrical boss 38 of a cover 124 fitted into a plug 224 threaded into the yoke half 108. The boss 38 receives a spring 39 which is held in place by a plug 39′ and urges the rod 15 in the direction of arrow B until the disk 37 seats against an inwardly turned flange 38′ of the boss 38. The sensor 13 is received with clearance in a bore 13′ of the brakeshoe 5, 5a which, as described in connection with FIGS. 1–4, is shiftable in the recess 7. In this embodiment the adjusting means comprises a nonrotatable spindle 110 which coaxially surrounds the rod 15 and is provided with an inwardly extending shoulder 43 engageable by a casing 19 which seizes the friction element 14. The external thread of the spindle 110 is engaged threadedly by a nut 111 which normally rests upon the annular seat 112 formed by the threaded cover 224 which is driven into the adjusting mechanism chamber of yoke half 108. The spring 120 of this embodiment continuously applies a torque to the nut 111 tending to rotate the same so as to axially advance the spindle 110 upon reduction of the friction force at the seat 112.

Within the interior 41 of the spindle 110, the casing 19 is provided with an outwardly turned flange 43′ resting against the shoulder 43 and an inwardly turned flange 42 bearing against the friction disk 14. Upon removal of the cover 124, the serrated or notch extremity 34 of the nut 111 can be engaged by hand or with a tool and rotated. To prevent contamination of the self-adjusting mechanism, a diaphragm seal 110′ hugs the rod 15 and is anchored to the inner wall of the chambers 41 of the spindle 110. The latter is provided with a pin 110″ engaging the backing plate 5a of the brakeshoe 5, 5a of the spindle. A further diaphragm seal 108′ hugs the spindle 110.

The actuating means for this embodiment comprises the wheelbrake piston 103 which is hydraulically shiftable in its cylinder 102 as previously described and a mechanical actuating system whose pin 40 bears upon the backing plate 4a of the brakeshoe 45. A lever 40a is swingably mounted at a fulcrum 40b upon the yoke half 101 for rotation by a bowden line 40c forming part of the emergency or parking brake.

When the brake is hydraulically actuated, the piston 103 is driven under high pressure from the master cylinder in the direction of arrow A and applies its brakeshoe 45 to the surface 9b of the disk 9. Upon engagement of the brake lining 4 with the disk surface of the disk 9, the reaction force draws yoke half 108 in the direction of arrow B to bring the brakeshoe 5, 5a into engagement with the disk. As the brake lining 5 wears, the backing plate 5a progresses upwardly with respect to the rod 15, thereby urging the friction disk 14 in the same direction relative to this rod which is prevented from movement by the engagement of its head 17 with disk surface 9a. Upon release of the brake pressure, the springs 39 displace the rod 15 relative to the retracting housing 108 until the flange 13′ and the flange 42 engage the respective members 14 and 43. The nut 111 is lifted during this period from the seat 112 to allow the torsion spring 120 to rotate and advance the spindle 110 as previously described.

The intermediate linkage between the friction element 14 and the shaft 15, which according to FIG. 5 is represented by the coupling link 19, is dispensed with in the embodiment of FIG. 6, where the friction element is received in a recess of the spindle 10 bordering against the backing plate 5a.

In all other respects the operational method is the same as shown in FIG. 5.

The significance of all three embodiments of my invention lies in the maintenance of a constant brake play through frictional elements combined with a feeler or sensor which must be sufficiently strong to resist wear compensation beyond a predetermined brake play, and adjustable conformably with the amount of wear of the brake lining.

The invention described and illustrated is believed to admit of modifications within the ability of persons skilled in the art, such modifications being considered within the spirit and scope of the appended claims.

I claim:

1. A disk brake comprising:
   a rotatable disk member having a pair of braking surfaces generally transverse to the axis of rotation of the disk member; a pair of brakeshoes respectively juxtaposed with said surfaces on opposite sides of said disk member and generally aligned with one another;
   a support member for one of said brakeshoes, said support member being limitedly displaceable transversely of said surfaces to bring said one of said brakeshoes into engagement with the corresponding surface of said disk member upon application of the other of said brakeshoes against the corresponding surface of said disk member;
   fluid-pressure means acting upon said other brakeshoe for urging same against said disk member; and
   adjusting means interposed between said one of said brakeshoes and said support member and responsive to the wear of said one of said brakeshoes for compensatorily shifting same relatively to said support member to maintain a substantially constant brake play between said brakeshoes and said disk member, said adjusting means including a variable length assembly in force-transmitting relation between said support member and said one of said brakeshoes, an axially shiftable wear-sensing element extending through said one of said brakeshoes and engageable with said disk for repositioning said one of said brakeshoes relative to said disk at a predetermined distance upon disengagement of said brakeshoes from said disk, and force-storing means operatively connected with said assembly for adjusting the length thereof in accordance with the distance by which said one of said brakeshoes is repositioned by said element.

2. The disk brake defined in claim 1 wherein said variable length assembly comprises a nonrotatable threaded spindle bearing against said one of said brakeshoes and an adjusting nut threadedly engaging said spindle and normally seated against said support member with frictional contact therewith retarding rotation of said nut, said force-storing means including a torsion spring engaging said nut and tending to rotate same upon release of the frictional force between said nut and said support member for advancing said spindle relatively to said support member.

3. The disk brake defined in claim 2 wherein said one of said brakeshoes is formed with a throughgoing opening and said wear-sensing element has a hardened head extending through said opening in said brakeshoe into contact with the respective surface of said disk, said wear-sensing element being further provided with friction means entraining said one of said brakeshoes for maintaining said head flush with the braking face of said one of said brakeshoes upon its engagement with the disk under the action of said fluid pressure means.

4. The disk brake defined in claim 3 wherein said wear-sensing element includes a rod mounted on said support member and extending toward said disk, a sleeve slidably mounted on said rod and carrying said head while frictionally engaging said one of said brakeshoes along the boundary of said opening and constituting said friction means, spring means in said sleeve yieldably resisting displacement of said sleeve relatively to said rod upon engagement of said one of said brakeshoes with said disk after wear of said one of said brakeshoes, and means on said sleeve engageable with said rod for limiting the displacement of said sleeve by said spring means upon disengagement of said one of said brakeshoes from said disk.

5. The disk brake defined in claim 4, further comprising means on said rod and said sleeve forming a releasable bayonet coupling therebetween, said spring means stressing said bayonet coupling to prevent inadvertent disengagement thereof.

6. The disk brake defined in claim 5, further comprising means for adjusting the distance of said rod from said disk member.

7. The disk brake defined in claim 3, wherein said wear-sensing element includes a rod movably mounted on said support means and extending in the direction of said disk and carrying said head at an end of said rod, said friction means being formed as at least one friction disk slidably along said rod, and means coupling said friction disk with said spindle, said wear-sensing element including spring means yieldably resisting displacement of said rod, and abutment means on said support means limiting the stroke of said rod in the direction of said disk member.

8. The disk brake defined in claim 3, further comprising auxiliary brakeshoe means carried by said support member and confronting said disk member for engagement therewith upon failure of said one of said brakeshoes.

9. The disk brake defined in claim 3, wherein said support member is the yoke of a fixed yoke disk brake, said disk brake further comprising mechanical means for urging said other of said brakeshoes against said disk.

10. The disk brake defined in claim 3, further comprising a pin coupling said spindle with said one of said brakeshoes for preventing rotation of said spindle.

11. The brake disk defined in claim 3 wherein said spindle is generally tubular and opens remote from said disk member, said disk brake further comprising a cover engaging said support member and closing said spindle, said wear-sensing element including a rod mounted on said cover and extending through said spindle.

12. The brake disk defined in claim 11 wherein said nut reaches substantially to said cover and is provided proximal to said cover with formations enabling manual adjustment of said nut.